(12) United States Patent
Kim

(10) Patent No.: US 11,846,335 B2
(45) Date of Patent: Dec. 19, 2023

(54) BRAKE APPARATUS FOR VEHICLE

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 162 days.

(21) Appl. No.: 17/133,401

(22) Filed: Dec. 23, 2020

(65) Prior Publication Data
US 2021/0215215 A1    Jul. 15, 2021

(30) Foreign Application Priority Data
Jan. 13, 2020  (KR) .......................... 10-2020-0004114

(51) Int. Cl.
| | |
|---|---|
| *B60T 13/74* | (2006.01) |
| *F16D 65/18* | (2006.01) |
| *F16D 121/04* | (2012.01) |
| *F16D 121/24* | (2012.01) |
| *F16D 125/40* | (2012.01) |

(52) U.S. Cl.
CPC ............ *F16D 65/18* (2013.01); *B60T 13/741* (2013.01); *F16D 2121/04* (2013.01); *F16D 2121/24* (2013.01); *F16D 2125/40* (2013.01)

(58) Field of Classification Search
CPC ............ F16D 2121/04; F16D 2125/40; F16D 2121/24; F16D 2125/06; F16D 65/18; F16D 2127/02; B60T 13/741
See application file for complete search history.

(56) References Cited

U.S. PATENT DOCUMENTS

| | | | | |
|---|---|---|---|---|
| 3,265,167 | A * | 8/1966 | Yazell, Jr. ............. | F16D 69/021 188/251 A |
| 5,429,216 | A * | 7/1995 | Kahr ................... | F16D 69/0408 188/73.31 |
| 5,613,577 | A * | 3/1997 | Collin ................. | F16D 65/0979 188/250 G |
| 2006/0220447 | A1* | 10/2006 | Giers ........................ | B60T 7/10 303/11 |
| 2012/0145491 | A1* | 6/2012 | Hyun .................... | F16D 65/183 188/71.8 |
| 2015/0300433 | A1* | 10/2015 | Yasui .................... | B60T 13/741 188/162 |
| 2015/0362033 | A1* | 12/2015 | Yasui .................. | F16H 57/0497 188/72.8 |
| 2017/0321771 | A1* | 11/2017 | Lee ......................... | F16D 65/18 |

FOREIGN PATENT DOCUMENTS

KR    10-1184575 B1    9/2012

* cited by examiner

*Primary Examiner* — Nicholas J Lane
(74) *Attorney, Agent, or Firm* — MORGAN, LEWIS & BOCKIUS LLP

(57) ABSTRACT

A brake apparatus for a vehicle may include: a screw bar positioned in a caliper body, and rotated by power received from a motor module; a nut configured to the outside of the screw bar, engaged and coupled with the screw bar, and moved toward a brake disk by the rotation of the screw bar; a piston connected to the nut, and moved with the nut; and a first brake pad connected to the piston, and moved with the piston so as to pressurize the brake disk.

7 Claims, 11 Drawing Sheets

BRAKE APPARATUS FOR VEHICLE

CROSS-REFERENCE TO RELATED APPLICATION

This application claims priority from and the benefit of Korean Patent Application No. 10-2020-0004114, filed on Jan. 13, 2020, which is hereby incorporated by reference for all purposes as if set forth herein.

BACKGROUND

Field

Exemplary embodiments of the present disclosure relate to a brake apparatus for a vehicle, and more particularly, to a brake apparatus for a vehicle which can reduce a part cost because the number of parts is decreased, and reduce the generation of drag torque.

DISCUSSION OF THE BACKGROUND

In general, an EPB (Electronic Parking Brake) of a vehicle converts a rotational force of a driving motor into a linear motion by using a screw and nut, in order to pressurize a piston. The pressurized piston presses a brake pad with a friction material against a wheel disk, thereby generating a braking force.

The conventional EPB includes a screw, a nut and a piston. That is, the conventional EPB requires a plurality of parts to pressurize the brake pad. Thus, a complex part manufacturing process needs to be applied, and the number of parts is increased to raise a part cost. Furthermore, in order for the nut to move the piston toward the brake pad while the nut is moved toward the piston by the operation of the screw, a separate part for pressing the nut against the piston needs to be added.

When the pressurization of the brake pad by the piston is released, a brake disk and the brake pad may not be perfectly spaced apart from each other, but contacted with each other, thereby not only generating drag torque, but also generating moan noise while noise occurs in the brake pad. Therefore, there is a need for an apparatus capable of solving the problem.

The related art of the present disclosure is disclosed in Korean Patent No. 10-1184575 entitled "Electronic Disk Brake System" and registered on Sep. 14, 2012.

SUMMARY

Various embodiments are directed to a brake apparatus for a vehicle which can reduce a part cost because the number of parts is decreased, and reduce the generation of drag torque.

In an embodiment, a brake apparatus for a vehicle may include: a screw bar positioned in a caliper body, and rotated by power received from a motor module; a nut configured to the outside of the screw bar, engaged and coupled with the screw bar, and moved toward a brake disk by the rotation of the screw bar; a piston connected to the nut, and moved with the nut; and a first brake pad connected to the piston, and moved with the piston so as to pressurize the brake disk.

The nut, the piston and the first brake pad may be formed as one body.

The nut may be formed in a pillar shape, have one end integrated with the piston, and include a nut hole having a female screw thread formed therein, the female screw thread being engaged and coupled with a male screw thread of the screw bar.

The piston is formed in a pillar shape whose one side is open, covers an outer surface of the nut, has a larger length than a protruding length of the nut, and includes an insertion portion into which the screw bar is inserted.

The first brake pad may include: a first back plate formed as one body with the piston, and disposed on one side of the brake disk; and a first friction member coupled to the first back plate, and configured to pressurize the brake disk.

The first friction member may be detachably coupled to the first back plate.

The first back plate may have a plurality of first coupling grooves formed therein, and the first frictional member may include a plurality of first coupling protrusions coupled to the plurality of first coupling grooves, respectively.

The brake apparatus may further include a second brake pad coupled to the caliper body so as to face the first brake pad, and contacted with the brake disk.

The second brake pad may include: a second back plate coupled to the caliper body, and disposed on the other side of the brake disk; and a second friction member coupled to the second back plate, and contacted with the brake disk.

The second friction member may be detachably coupled to the second back plate.

The second back plate may have a plurality of second coupling grooves formed therein, and the second friction member may include a plurality of second coupling protrusions coupled to the plurality of second coupling grooves, respectively.

In the brake apparatus for a vehicle in accordance with the embodiment of the present disclosure, the nut, the piston and the first brake pad may be manufactured as one body. Thus, when a braking force is released, the first brake pad may be completely spaced apart from the brake disk, thereby reducing the generation of drag torque.

Furthermore, since the piston and the first brake pad may be manufactured as one body, a number of parts are not required, which makes it possible to not only reduce the number of parts and the part cost, but also reduce the number of manufacturing steps and the manufacturing time.

DETAILED DESCRIPTION OF THE ILLUSTRATED EMBODIMENTS

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
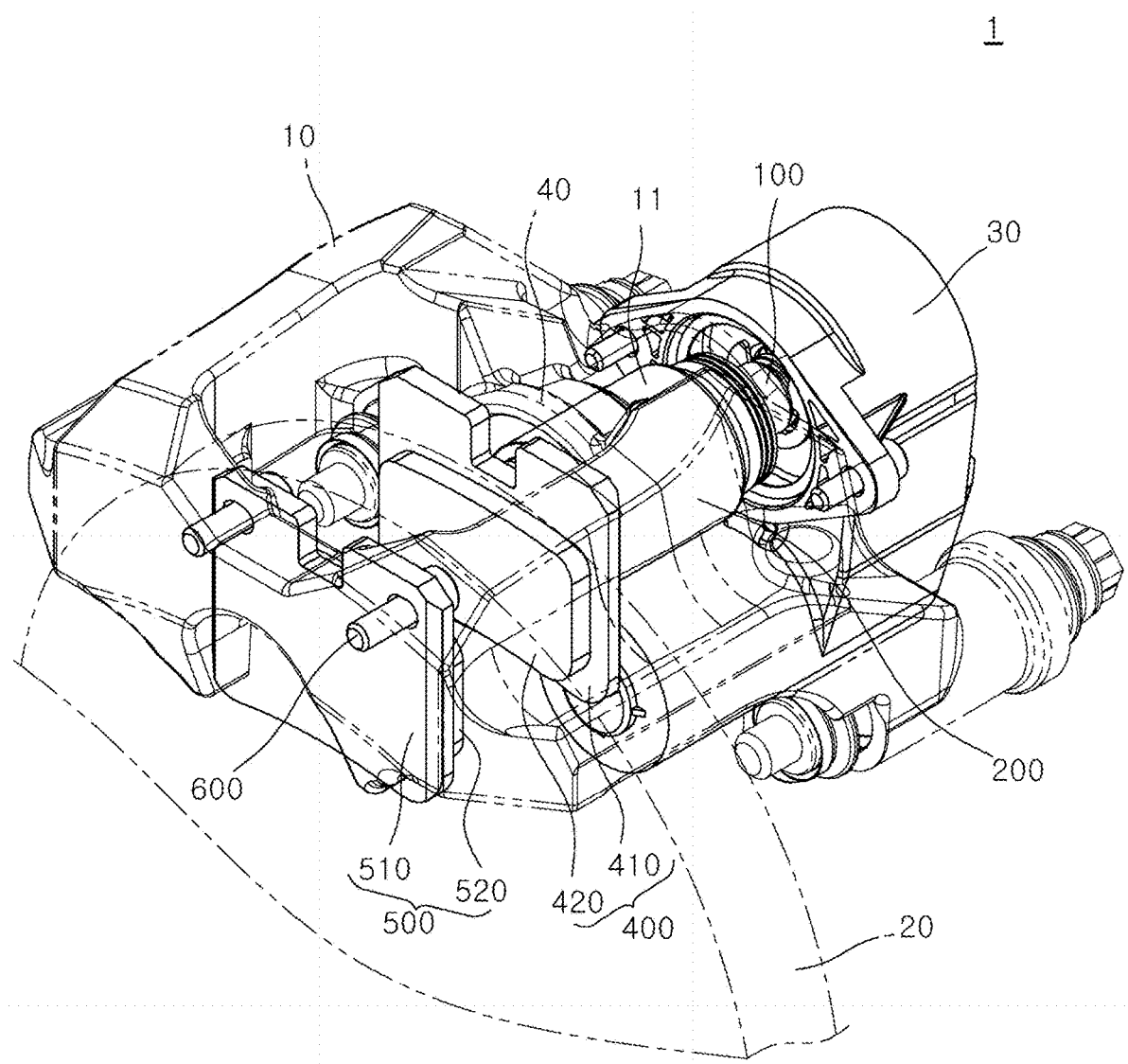
FIG. 1 is a front view illustrating a brake apparatus for a vehicle in accordance with an embodiment of the present disclosure.
Figure 2:
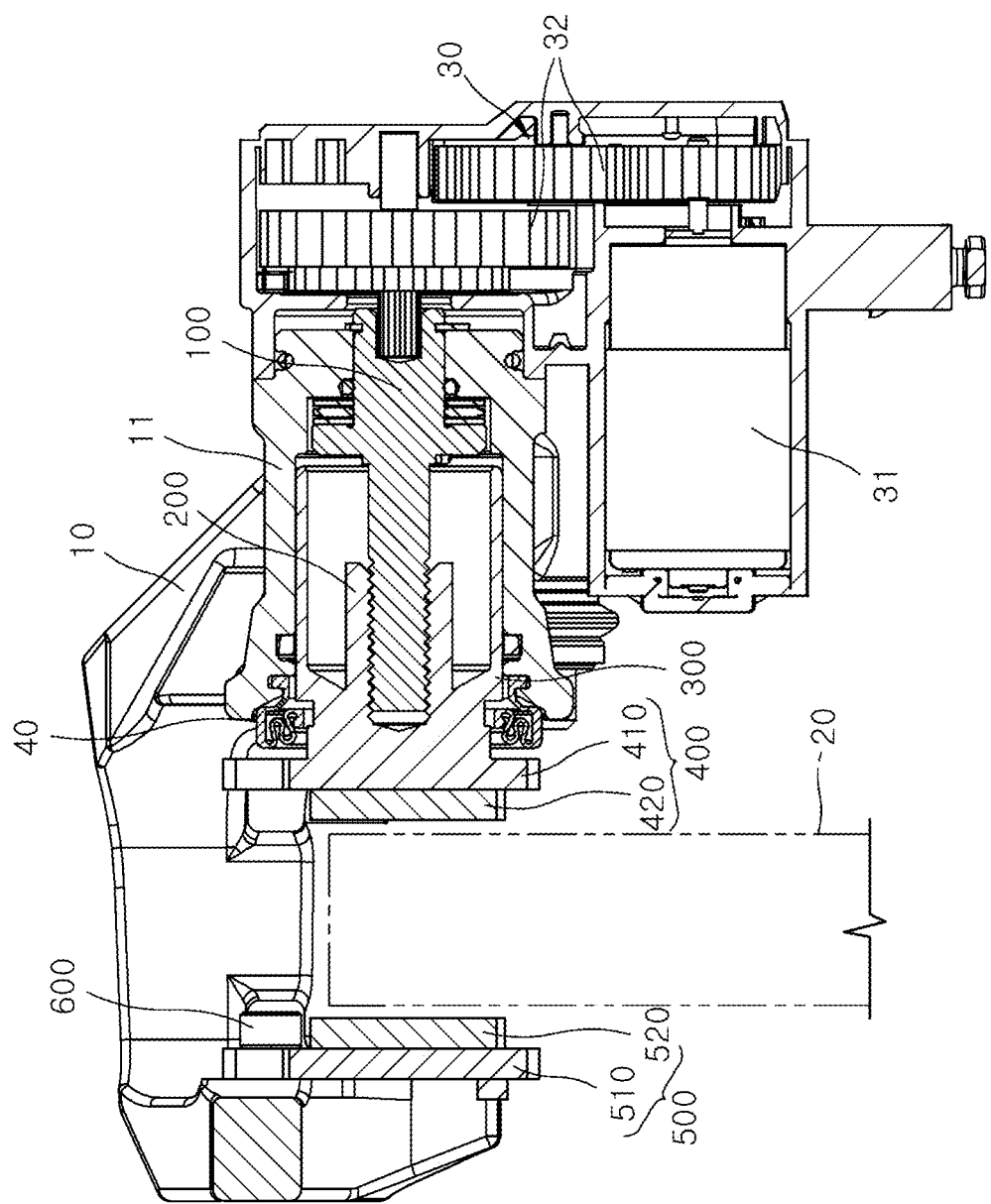
FIG. 2 is a cross-sectional view illustrating the brake apparatus for a vehicle in accordance with the embodiment of the present disclosure.
Figure 3:
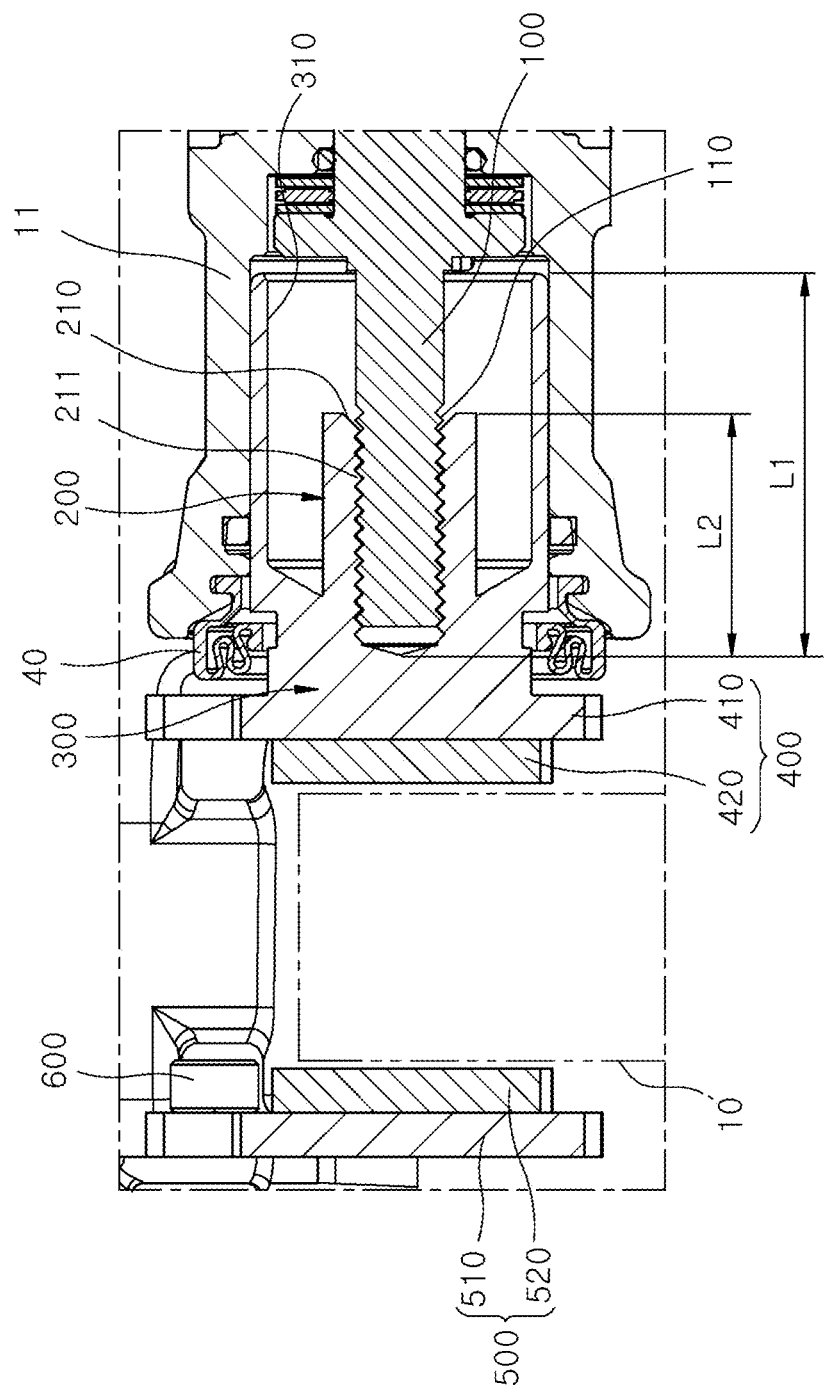
FIG. 3 is a cross-sectional view illustrating main parts of FIG. 2.
Figure 4:
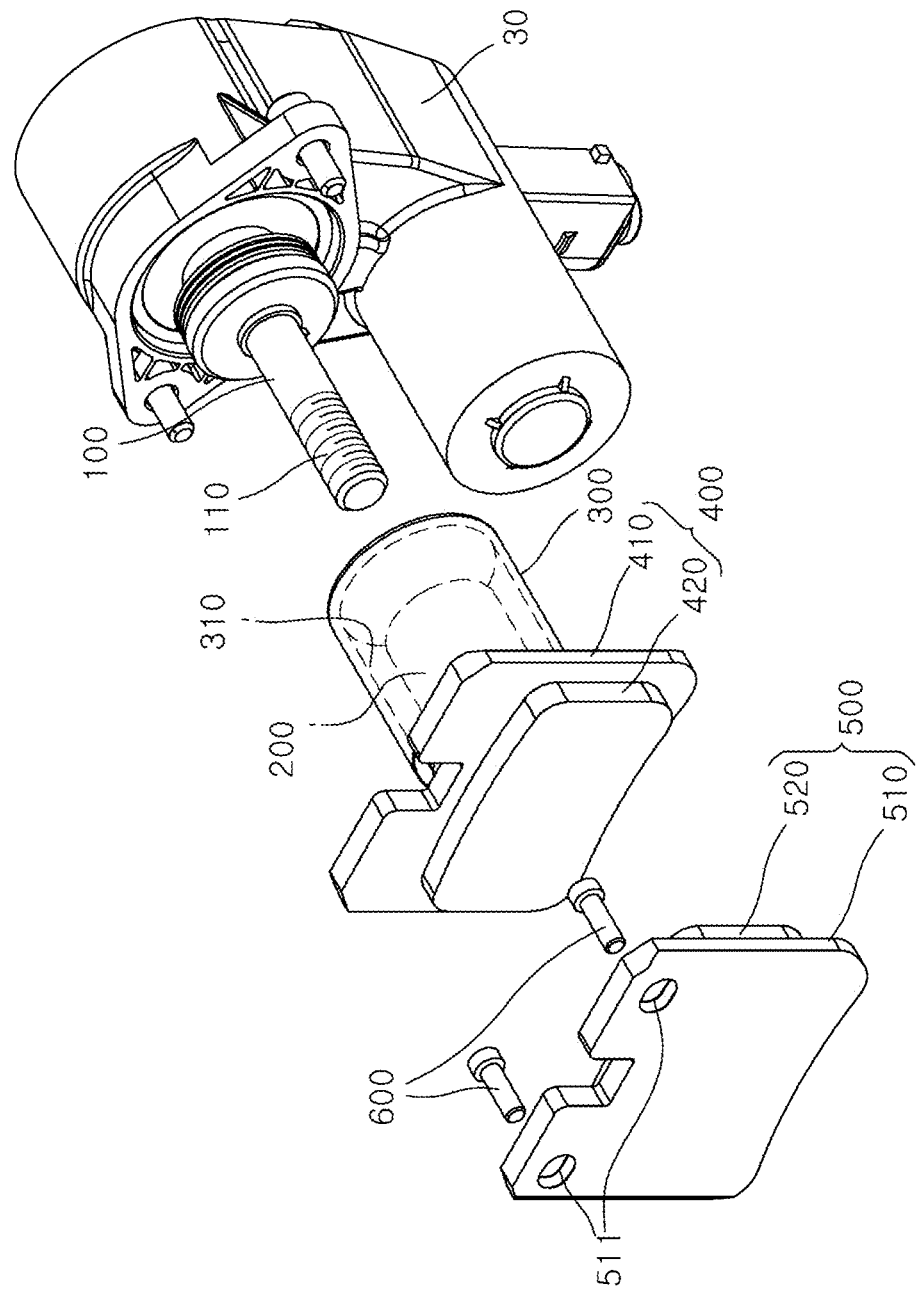
FIG. 4 is an exploded perspective view illustrating main parts of the brake apparatus for a vehicle in accordance with the embodiment of the present disclosure.
Figure 5:
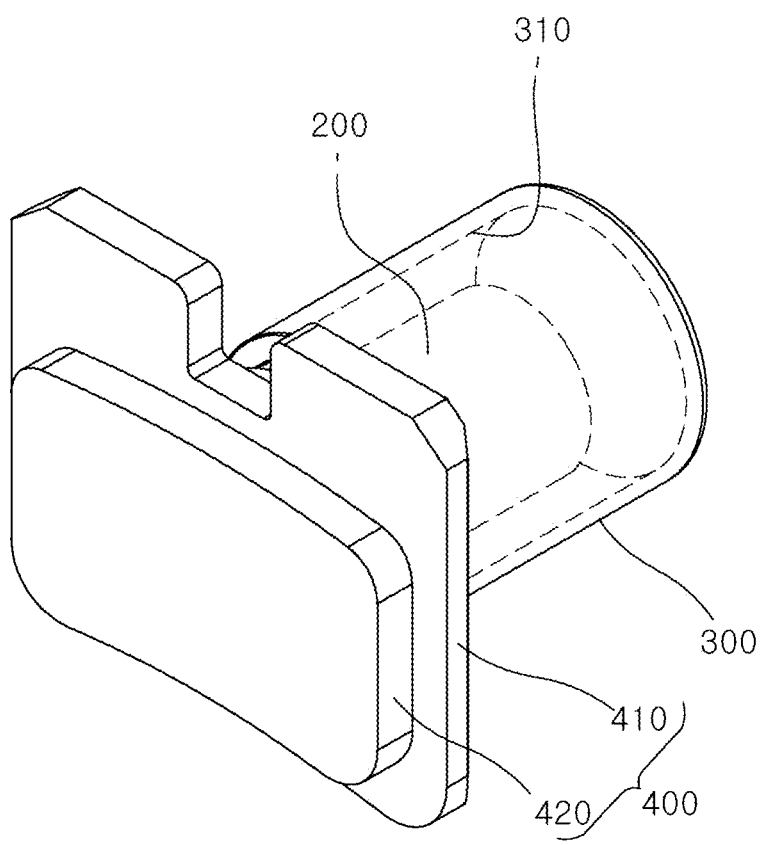
FIG. 5 is a perspective view illustrating a nut, a piston and a first brake pad of the brake apparatus for a vehicle in accordance with the embodiment of the present disclosure.
Figure 6:
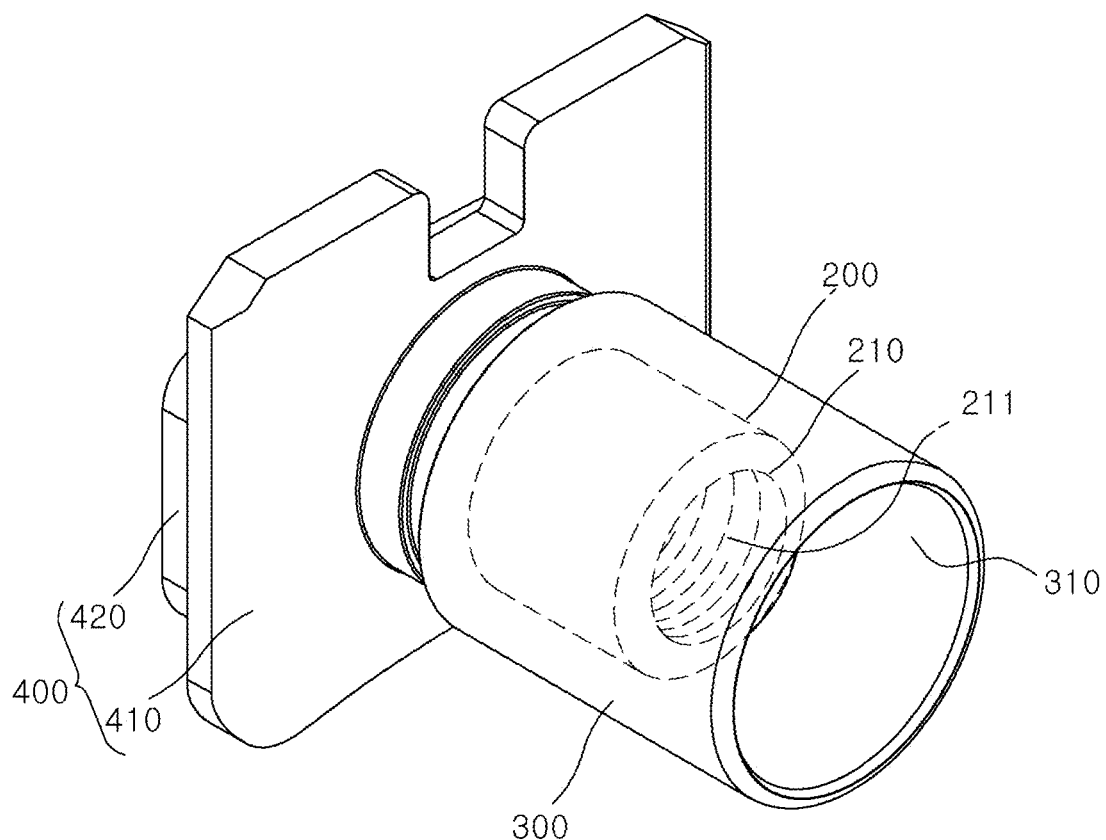
FIG. 6 is a perspective view illustrating the nut, the piston and the piston of the brake apparatus for a vehicle in accordance with the embodiment of the present disclosure, when seen from a different direction.
Figure 7:
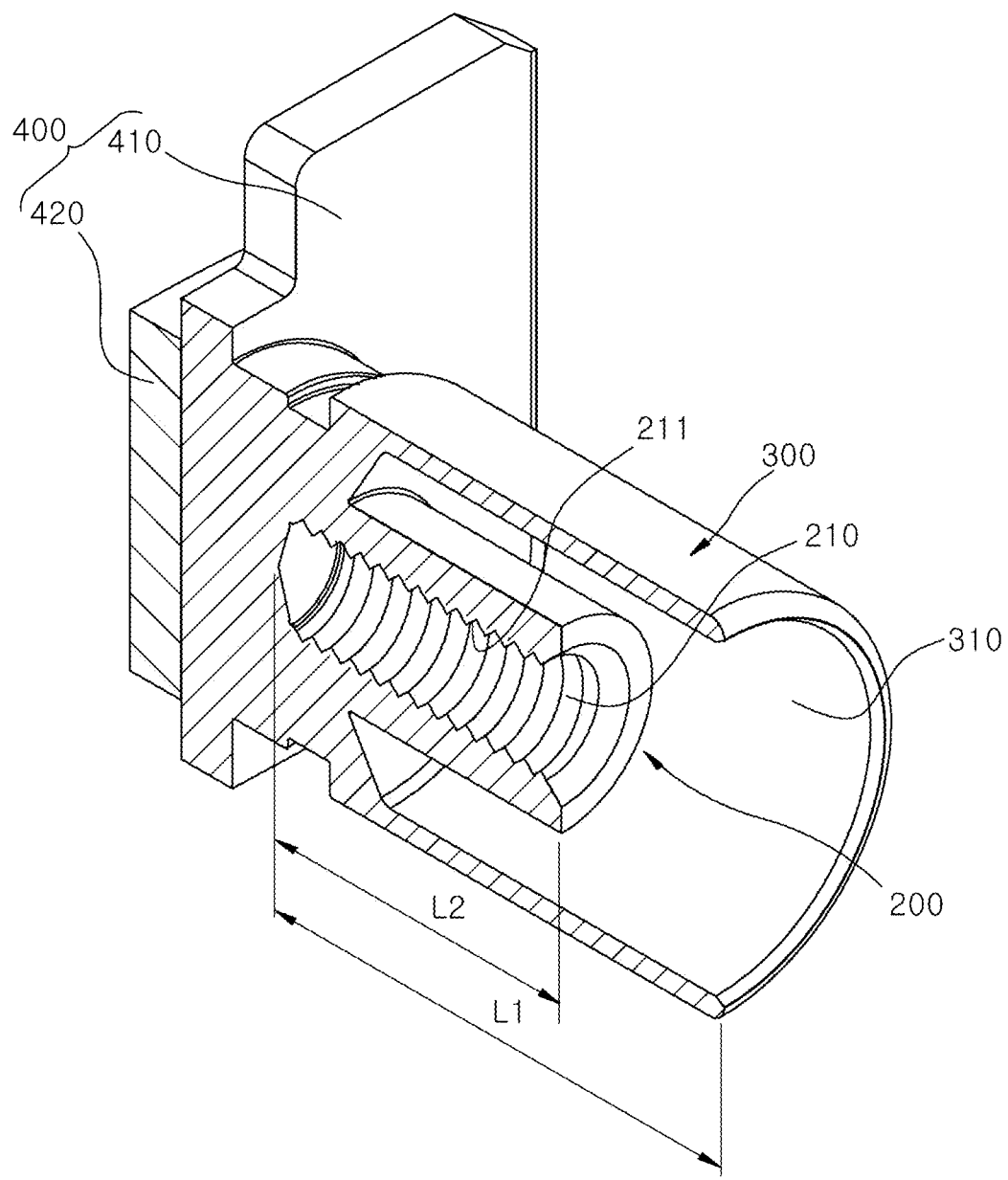
FIG. 7 is a half-cross sectional perspective view of FIG. 6.
Figure 8:
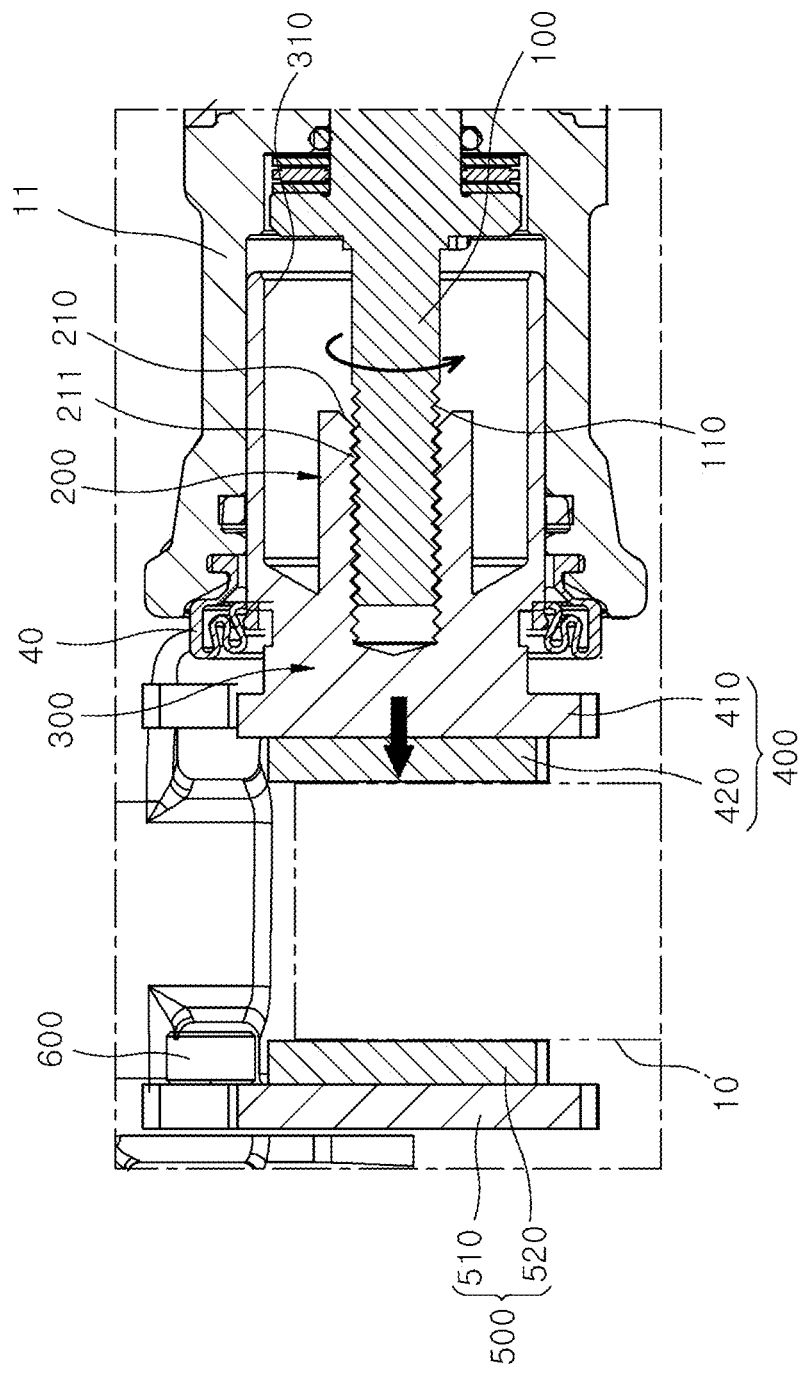
FIGS. 8 and 9 are diagrams illustrating an operation of the brake apparatus for a vehicle in accordance with the embodiment of the present disclosure.
Figure 9:
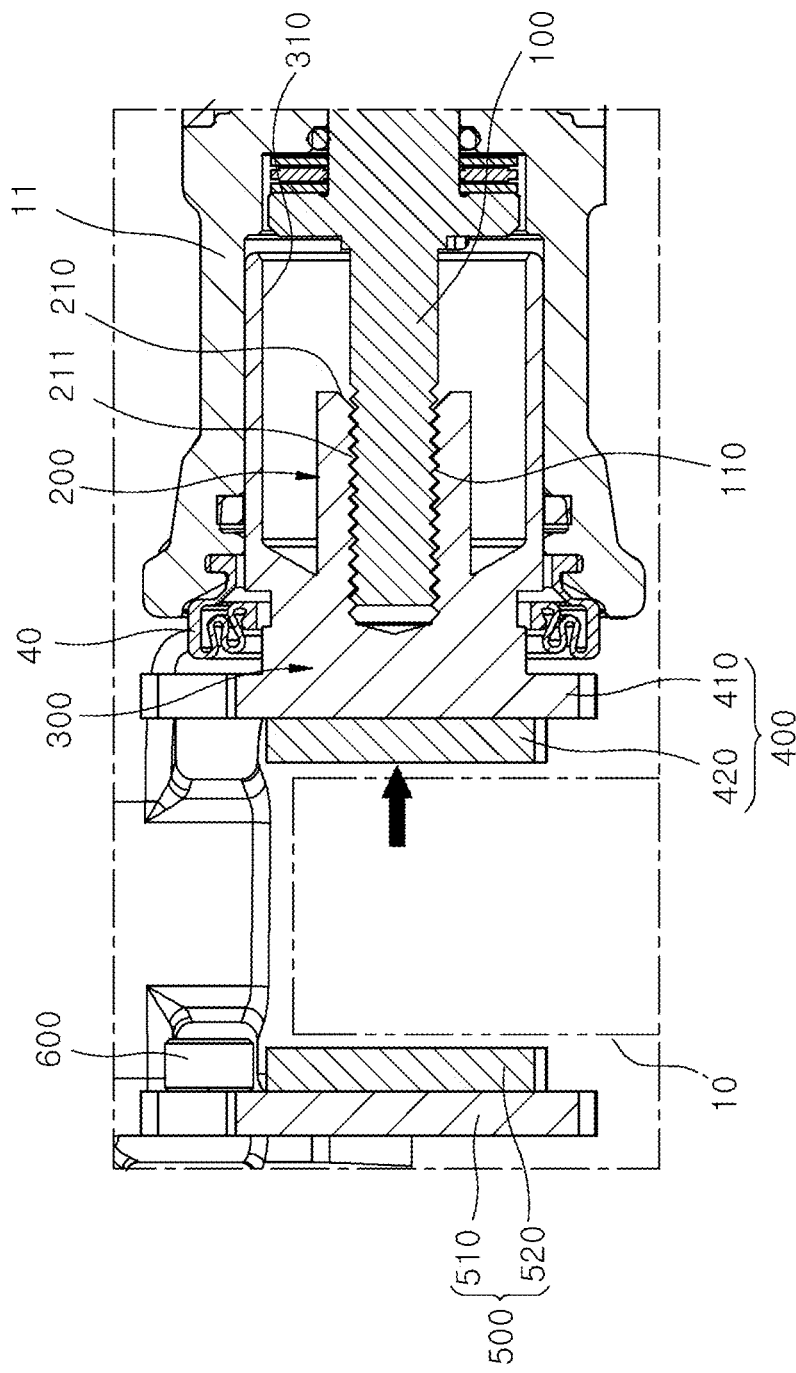

FIG. 1 is a front view illustrating a brake apparatus for a vehicle in accordance with an embodiment of the present disclosure, FIG. 2 is a cross-sectional view illustrating the brake apparatus for a vehicle in accordance with the embodiment of the present disclosure, FIG. 3 is a cross-sectional views illustrating main parts of FIG. 2, FIG. 4 is an exploded perspective view illustrating main parts of the brake apparatus for a vehicle in accordance with the embodiment of the present disclosure, FIG. 5 is a perspective view illustrating a nut, a piston and a first brake pad of the brake apparatus for a vehicle in accordance with the embodiment of the present disclosure, FIG. 6 is a perspective view illustrating the nut, the piston and the piston of the brake apparatus for a vehicle in accordance with the embodiment of the present disclosure, when seen from a different direction, FIG. 7 is a half-cross sectional perspective view of FIG. 6, and FIGS. 8 and 9 are diagrams illustrating an operation of the brake apparatus for a vehicle in accordance with the embodiment of the present disclosure.

Referring to FIGS. 1 to 7, a brake apparatus 1 for a vehicle in accordance with an embodiment of the present disclosure includes a screw bar 100, a nut 200, a piston 300 and a first brake pad 400. The screw bar 100 is positioned in a caliper body 10, and rotated by power received from a motor module 30. The motor module 30 includes a motor 31 and a plurality of gears 32. Any one of the gears 32 is connected to the motor 31, and another of the gears 32 is connected to the screw bar 100. The gears 32 receive a rotational force from the motor 31, and rotate the screw bar 100. At this time, the screw bar 100 is formed in a rod shape and inserted into the nut 200. The screw bar 100 has a male screw thread 110 formed on the outside thereof, and is rotated by the rotational force received from the motor 31.

The nut 200 covers the outside of the screw bar 100, and is engaged and coupled with the screw bar 100, and moved toward a brake disk 20 by the rotation of the screw bar 100. Specifically, when the screw bar 100 is rotated in a predetermined direction, the nut 200 is moved toward the brake disk 20, while converting the rotational motion of the screw bar 100 into a linear motion. On the contrary, when the screw bar 100 is rotated in the opposite direction of the predetermined direction, the nut 200 is moved toward the opposite side of the brake disk 20.

The piston 300 is connected to the nut 200, and moved with the nut 200. The piston 300 has a shape to cover the outside of the nut 200, and is formed as one body with the nut 200. The piston 300 is moved toward the brake disk 20 or the opposite side of the brake disk 20 with the nut 200 on a cylinder 11 of the caliper body 10.

Between the piston 300 and the caliper body 10, a sealing member 40 may be installed. As the sealing member 40, various types of sealing members may be used as long as the sealing members can perform a sealing action. The sealing member 40 is installed in the cylinder 11 of the caliper body 10 facing the piston 300.

The first brake pad 400 is connected to the piston 300, and moved with the piston 300 so as to pressurize the brake disk 20. The first brake pad 400 is formed as one body with the nut 200 and the piston 300, and moved with the nut 200 and the piston 300 toward the brake disk 20, thereby pressurizing the brake disk 20. On the contrary, the first brake pad 400 is moved with the nut 200 and the piston 300 toward the opposite side of the brake disk 20, and releases the pressurization of the brake disk 20.

The nut 200, the piston 300 and the first brake pad 400 are formed as one body. Therefore, when the screw bar 100 is rotated in the predetermined direction, the nut 200, the piston 300 and the first brake pad 400 may be moved toward the brake disk 20 at the same time, and the first brake pad 400 may pressurize the brake disk 20 to generate a braking force.

Then, when the screw bar 100 is rotated in the opposite direction of the predetermined direction, the nut 200, the piston 300 and the first brake pad 400 may be moved toward the opposite side of the brake disk 20 at the same time, and the braking force may be released as the first brake pad 400 is spaced apart from the brake disk 20. At this time, the first brake pad 400 may be perfectly spaced apart from the brake disk 20, which makes it possible to reduce the generation of drag torque.

In the brake apparatus 1 for a vehicle in accordance with the embodiment of the present disclosure, the nut 200, the piston 300 and the first brake pad 400 may be manufactured as one body. Thus, when a braking force is released, the first brake pad 400 may be perfectly spaced apart from the brake disk 20, thereby reducing the generation of drag torque. Furthermore, compared to the conventional brake apparatus for a vehicle, the brake apparatus 1 can reduce the number of manufacturing steps and thus shorten the manufacturing time. In addition, since the brake apparatus 1 does not require a large number of parts, the number of parts may be decreased to reduce the part cost.

The nut 200 is formed in a pillar shape, has one end integrated with the piston 300, and includes a nut hole 210 having a female screw thread 211 formed therein, the female screw thread 211 being engaged and coupled with the male screw thread 110 of the screw bar 100.

The piston 300 is formed in a pillar shape whose one side is open, and covers the outer surface of the nut 200. In other words, the piston 300 has a cylindrical shape and is formed as one body with the nut 200, one side of the piston 300, into which the screw bar 100 is inserted, is open, and the other side of the piston 300, facing the first brake pad 400, is closed. The piston 300 has a length L1 larger than a protruding length L2 of the nut 200, and includes an insertion part 310 into which the screw bar 100 is inserted. Thus, the piston 300 may cover the outside of the screw bar 100, and thus protect the screw bar 100 from the outside.

The first brake pad 400 includes a first back plate 410 and a first friction member 420. The first back plate 410 is formed as one body with the piston 300, and disposed on one side of the brake disk 20. The first back plate 410 is moved with the piston 300 toward the brake disk 20 or the opposite side of the brake disk 20.

The first friction member 420 is coupled to the first back plate 410, and pressurizes the brake disk 20. The first friction member 420 may be made of an elastic material, and pressurizes one side of the brake disk 20. The first friction member 420 is coupled to a surface of the first back plate 410, facing the brake disk 20.

The brake apparatus 1 for a vehicle further includes a second brake pad 500. The second brake pad 500 is coupled to the caliper body 10, and contacted with the brake disk 20.

The second brake pad 500 includes a second back plate 510 and a second friction member 520. The second back plate 510 is coupled to the caliper body 10, and disposed on the other side of the brake disk 20. The second back plate 510 is coupled to the caliper body 10 so as to face the first brake pad 400. The second back plate 510 is coupled to the caliper body 10 by a bolt member 600. Specifically, the bolt member 600 is coupled to the caliper body 10 through a second coupling hole 511 of the second back plate 510.

The second friction member 520 is coupled to the second back plate 510, and contacted with the brake disk 20. The second friction member 520 may be made of an elastic material, and contacted with the other side of the brake disk 20. The second friction member 520 is coupled to a surface of the second back plate 510, facing the brake disk 20.

Figure 10:
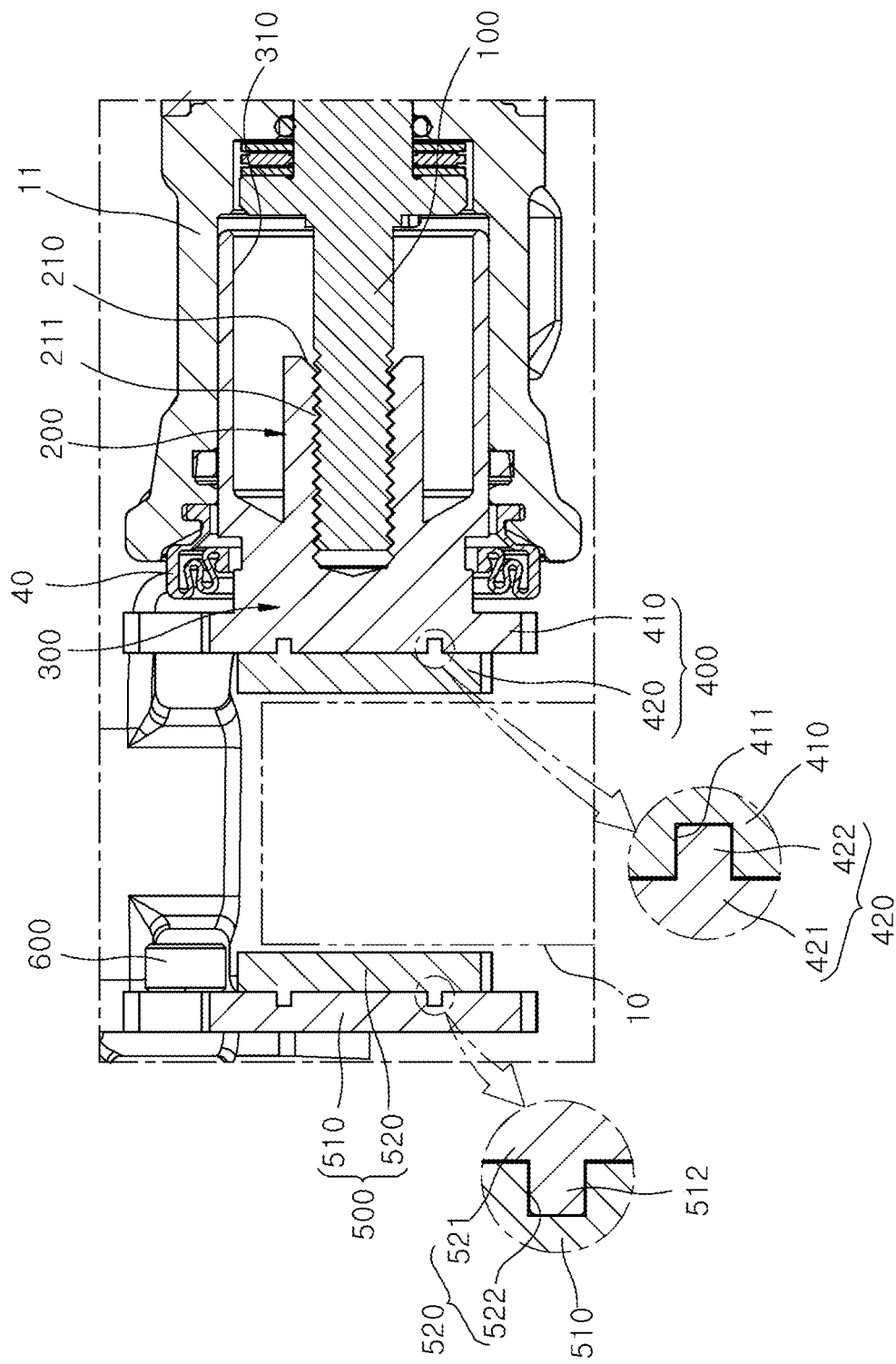
FIG. 10 is a cross-sectional view illustrating main parts of a brake apparatus for a vehicle in accordance with another embodiment of the present disclosure.
Figure 11:
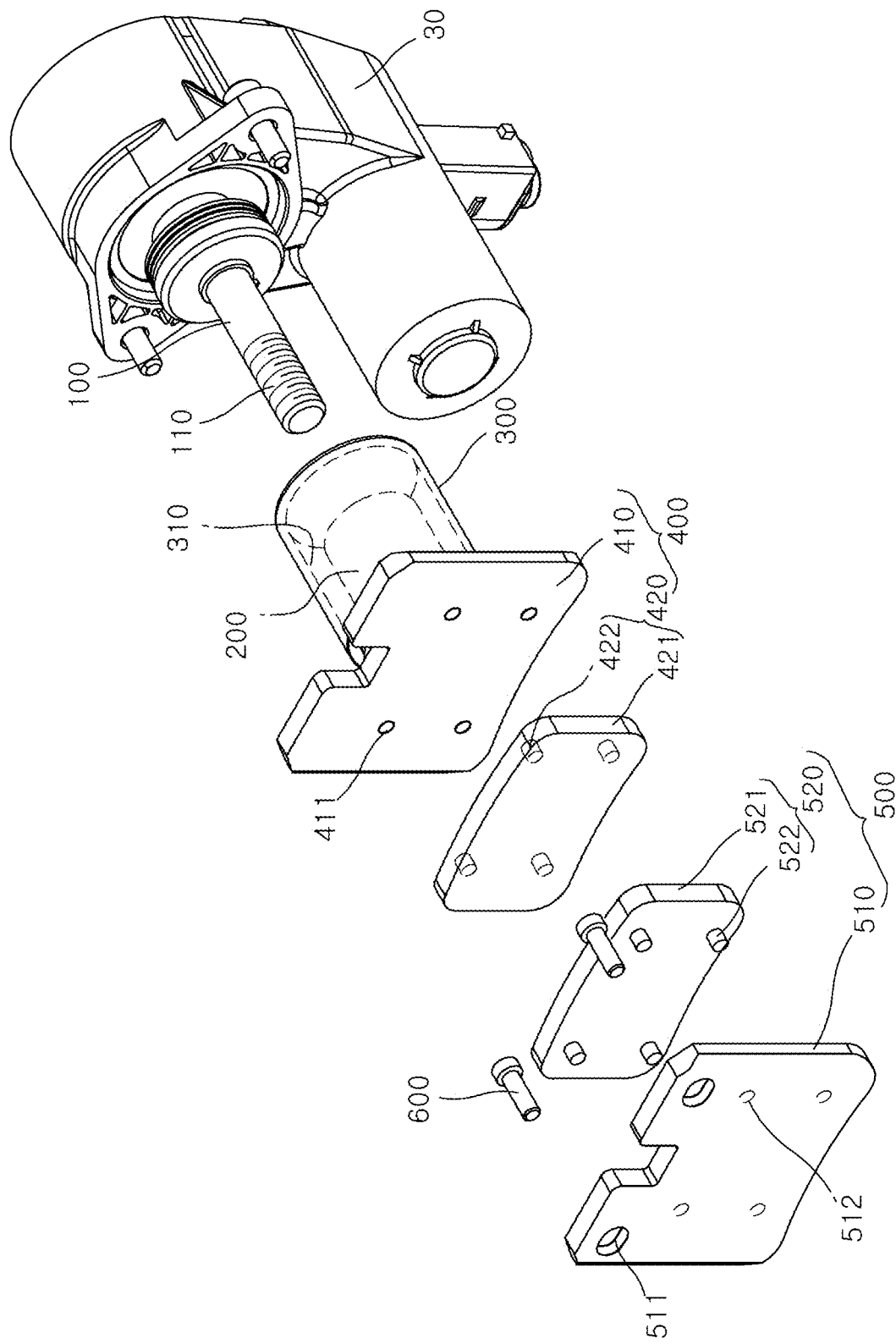
FIG. 11 is an exploded perspective view illustrating the brake apparatus for a vehicle in accordance with the another embodiment of the present disclosure.

FIG. 10 is a cross-sectional view illustrating main parts of a brake apparatus for a vehicle in accordance with another embodiment of the present disclosure, and FIG. 11 is an exploded perspective view illustrating the brake apparatus for a vehicle in accordance with the another embodiment of the present disclosure.

Hereafter, the brake apparatus for a vehicle in accordance with the another embodiment of the present disclosure will be described. At this time, the detailed descriptions of the same contents of the another embodiment as those of the above-described embodiment will be omitted herein.

Referring to FIGS. 10 and 11, a first friction member 420 in the brake apparatus 1 for a vehicle in accordance with the another embodiment of the present disclosure is detachably coupled to a first back plate 410. The first back plate 410 has a plurality of first coupling grooves 411 formed therein. The plurality of first coupling grooves 411 are disposed in the first back plate 410 at locations facing the first friction member 420, and spaced apart from each other.

The first friction member 420 includes a plurality of first coupling protrusions 422 coupled to the plurality of first coupling grooves 411, respectively. Specifically, the first friction member 420 includes a first friction member body 421 and the plurality of first coupling protrusions 422. The first friction member body 421 is formed in a plate shape, and disposed to face the first back plate 410. The plurality of first coupling protrusions 422 protrude from the first friction member body 421 toward the first back plate 410 so as to be spaced apart from each other. That is, the first coupling protrusions 422 protrude toward the first coupling grooves 411 of the first back plate 410.

The plurality of first coupling protrusions 422 are disposed on a surface of the first friction member body 421, facing the first back plate 410, and spaced apart from each other at the same intervals as the first coupling grooves 411. Thus, when the first friction member 420 is replaced, the first friction member 420 may be easily detached from the first back plate 410.

A second friction member 520 is detachably coupled to a second back plate 510. The second back plate 510 has a plurality of second coupling grooves 512 formed therein. The plurality of second coupling grooves 512 are disposed on the second back plate 510 at locations facing the second friction member 520, and spaced apart from each other.

The second friction member 520 includes a plurality of second coupling protrusions 522 coupled to the plurality of second coupling grooves 512, respectively. Specifically, the second friction member 520 includes a second friction member body 521 and the plurality of second coupling protrusions 522. The second friction member body 521 is formed in a plate shape, and disposed to face the second back plate 510. The plurality of second coupling protrusions 522 protrude from the second friction member body 521 toward the second back plate 510 so as to be spaced apart from each other. That is, the second coupling protrusions 522 protrude toward the second coupling groove 512 of the second back plate 510.

The plurality of second coupling protrusions 522 are disposed on a surface of the second friction member body 521, facing the second back plate 510, and spaced apart from each other at the same intervals as the second coupling grooves 512. Thus, when the second friction member 520 is replaced, the second friction member 520 may be easily detached from the second back plate 510.

Hereafter, the operation and effect of the brake apparatus for a vehicle in accordance with the embodiment of the present disclosure will be described with reference to FIGS. 8 and 9.

When a braking force is generated by the brake apparatus 1 for a vehicle, the screw bar 100 is rotated in a predetermined direction by power received from the motor module 30, and the nut 200 engaged and coupled with the screw bar 100 is moved toward the brake disk 20. When the nut 200 is moved toward the brake disk 20, the first brake pad 400 and the piston 300 formed as one body with the nut 200 are also moved toward the brake disk 20. Then, the first brake pad 400 pressurizes the brake disk 20, and the second brake pad 500 connected to the caliper body 10 is contacted with the brake disk 20. Thus, a braking force is generated.

When the braking force is released, the screw bar 100 is reversely rotated. That is, the screw bar 100 is rotated in the opposite direction of the predetermined direction, and the nut 200 engaged and coupled with the screw bar 100 is moved toward the opposite side of the brake disk 20. When the nut 200 is moved toward the opposite side of the brake disk 20, the first brake pad 400 and the piston 300 formed as one body with the nut 200 are also moved toward the opposite side of the brake disk 20. Thus, the first brake pad 400 is spaced apart from the brake disk 20. At this time, the first brake pad 400 may be completely spaced apart from the brake disk 20, and reduce drag torque generated between the first brake pad 400 and the brake disk 20. Simultaneously, the second brake pad 500 is also spaced apart from the brake disk 20. Thus, the braking force is released.

In the brake apparatus 1 for a vehicle in accordance with the embodiment of the present disclosure, the nut 200, the piston 300 and the first brake pad 400 may be manufactured as one body. Thus, when a braking force is released, the first brake pad 400 may be completely spaced apart from the brake disk 20, thereby reducing the generation of drag torque.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
a screw bar positioned in a caliper body, and rotated by power received from a motor module, the screw bar including a first portion formed in a rod shape and a second portion which has a larger diameter than the first portion;
a nut configured to be engaged and coupled with a male screw thread on an outer surface of the first portion of the screw bar, and moved toward a brake disk by the rotation of the screw bar;
a piston formed in a pillar shape having a hollow portion configured to cover an outer surface of the nut which has one end integrated with an inside of the piston and protrudes from the one end toward to an open end of the piston and configured to be moved with the nut,
wherein the first portion of the screw bar is inserted into the open end of the piston and the second portion is not inserted into the open end of the piston,
the piston has a length L1 to cover the outer surface of the nut coupled with the first portion of the screw bar and another outer surface of the first portion of the screw bar which does not have the male screw thread there on, the nut has a length L2 which is shorter than the length L1; and
a first brake pad connected to the piston, and moved with the piston so as to pressurize the brake disk,
wherein the first brake pad includes a first back plate includes a plurality of first coupling grooves formed therein,
a first friction member made of elastic material includes a plurality of first coupling protrusions coupled to the plurality of first coupling grooves, respectively, so that the first friction member is detachably coupled to the first back plate,
wherein the nut, the piston and the first brake pad are formed as one body and moved together toward the brake disk.

2. The brake apparatus of claim 1, wherein the nut includes a nut hole having a female screw thread formed therein, the female screw thread being engaged and coupled with the male screw thread of the first portion of the screw bar.

3. The brake apparatus of claim 2, wherein
the first back plate formed as one body with the piston, and disposed on one side of the brake disk; and
the first friction member coupled to the first back plate, and configured to pressurize the brake disk.

4. The brake apparatus of claim 1, further comprising a second brake pad coupled to the caliper body so as to face the first brake pad, and contacted with the brake disk.

5. The brake apparatus of claim 4, wherein the second brake pad comprises:
a second back plate coupled to the caliper body, and disposed on the other side of the brake disk; and
a second friction member coupled to the second back plate, and contacted with the brake disk.

6. The brake apparatus of claim 5, wherein the second friction member is detachably coupled to the second back plate.

7. The brake apparatus of claim 6, wherein the second back plate has a plurality of second coupling grooves formed therein, and
the second friction member includes a plurality of second coupling protrusions coupled to the plurality of second coupling grooves, respectively.

* * * * *